May 23, 1972     A. A. GREENBERG     3,664,788
DEVICE FOR DEPOSITING DOTS OF MOLDING COMPOUND
Filed Nov. 23, 1970     3 Sheets-Sheet 1
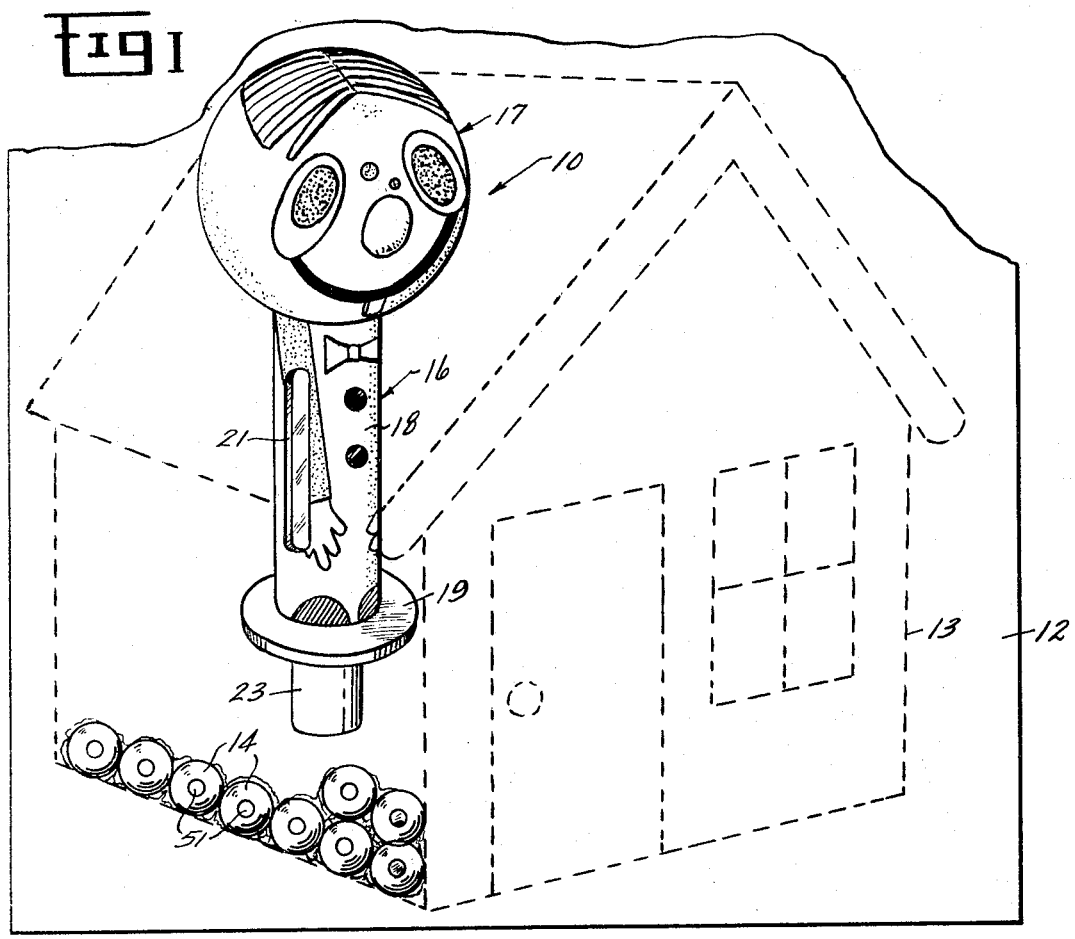
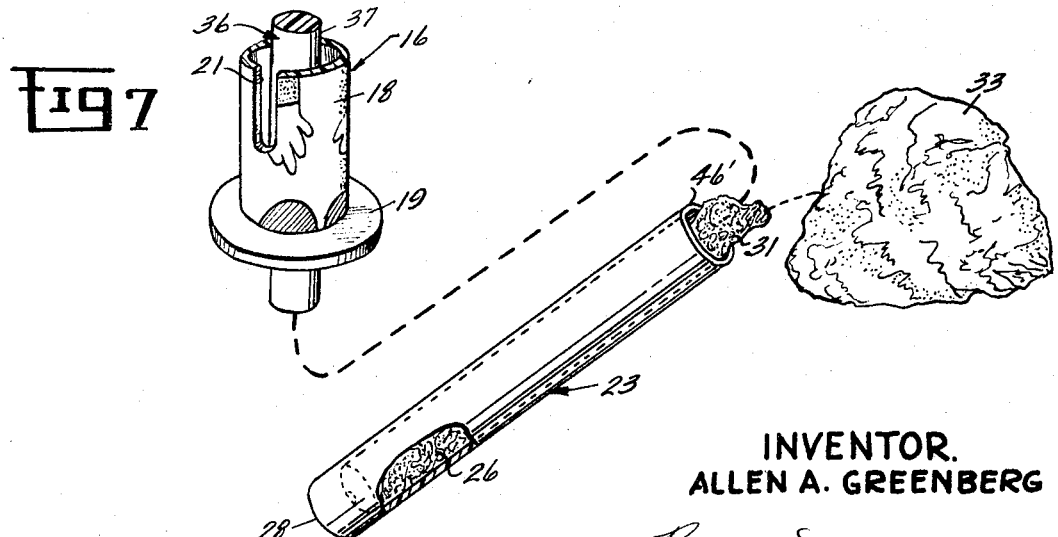
INVENTOR.
ALLEN A. GREENBERG
By Pearne & Schaeperkleus
ATTORNEYS-

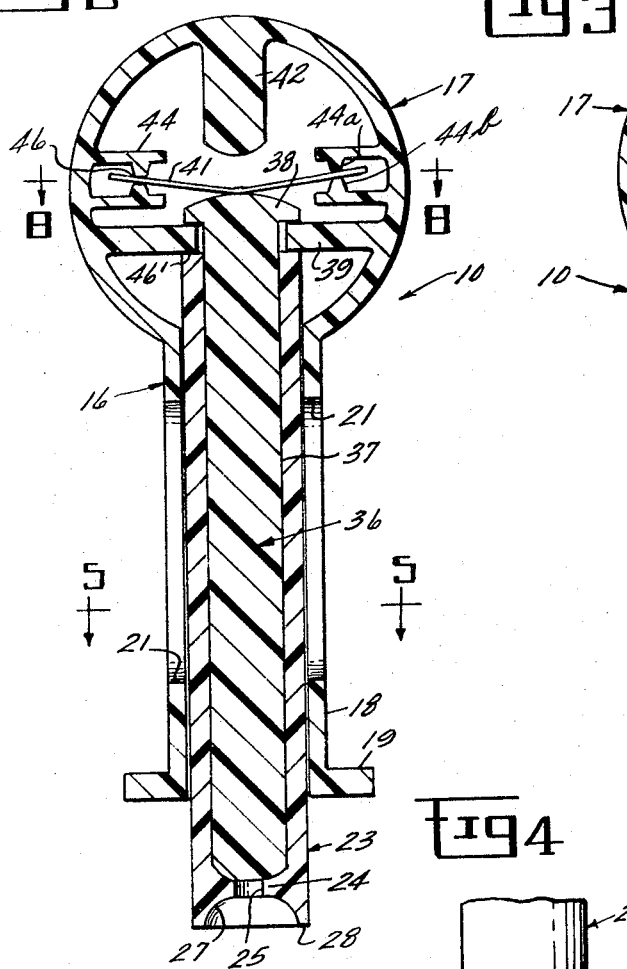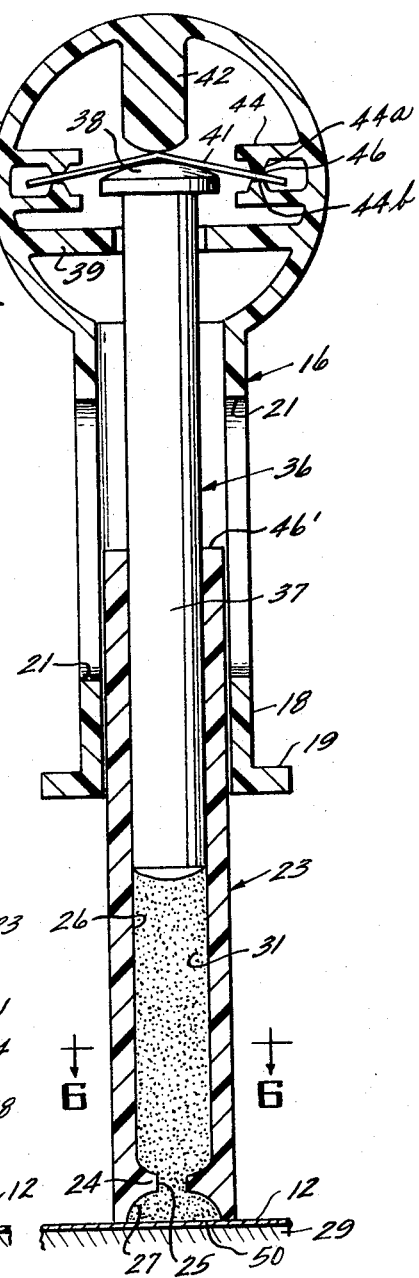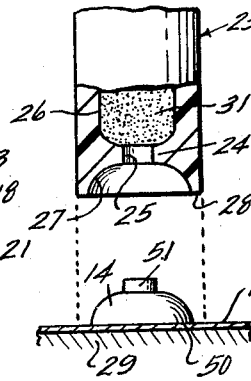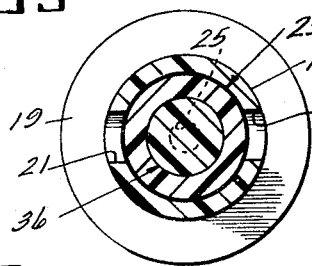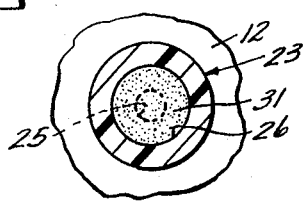
INVENTOR.
ALLEN A. GREENBERG

May 23, 1972    A. A. GREENBERG    3,664,788
DEVICE FOR DEPOSITING DOTS OF MOLDING COMPOUND
Filed Nov. 23, 1970    3 Sheets-Sheet 3

INVENTOR.
ALLEN A. GREENBERG

By Pearce & Schaeferklaus

ATTORNEYS-

United States Patent Office 3,664,788
Patented May 23, 1972

3,664,788
DEVICE FOR DEPOSITING DOTS OF MOLDING COMPOUND

Allen A. Greenberg, Springfield Township, Hamilton County, Ohio (9149 Peachblossom Court, Cincinnati, Ohio 45231)
Filed Nov. 23, 1970, Ser. No. 91,841
Int. Cl. B29f 1/00
U.S. Cl. 425—109                                                      7 Claims

ABSTRACT OF THE DISCLOSURE

A device for depositing dots of molding compound on an absorbent sheet. A tubular die member slides inside a guide portion of a hollow body. A plunger telescopes in a main chamber of the die member. A leaf spring mounted in the body engages the head of the plunger. The spring exerts force on the plunger. The spring yields with an audible click when the body is urged with more than sufficient force to extrude molding compound.

---

This invention relates to a device for depositing dots of molding compound on a sheet of paper or the like.

An object of this invention is to provide a device which forms dots of molding compound which are deposited on and adhere to a sheet of absorbent paper.

A further object of this invention is to provide a device which extrudes dots of molding composition and gives an audible click when pressure exerted on the device is more than sufficient to cause extrusion.

Briefly, this invention provides a device for depositing dots of molding compound which includes a tubular die member in which molding compound is received and a plunger which forces the molding compound from the tubular die member. The moding compound is extruded through an orifice in the die member into an open-faced mold chamber. The molding compound breaks at the orifice when the portion at the open face of the mold chamber engages a sheet of absorbent paper to stick to the paper. The plunger is carried by a hollow body having a hollow head in which a spring member is mounted and engages a head end of the plunger. A tubular portion of the body guides the die member and the plunger. When an end of the die member at the open face of the mold chamber engages the sheet of paper and the body is advanced toward the sheet, the spring urges the plunger to extrude the molding compound through the orifice into the mold chamber. When the pressure exerted is more than just sufficient to cause extrusion of the molding compound, the spring yields and changes position with an audible click. Further advance of the body causes a back-up lug in the head to engage the spring for driving the plunger farther along the tubular die member to cause further extrusion of the molding compound.

The above and other objects and features of the invention will be apparent to those skilled in the art to which this invention pertains from the following detailed description and drawings, in which:

FIG. 1 is a perspective view of a dot extruding and depositing device constructed in accordance with an embodiment of this invention, a design on a sheet of absorbent paper being shown in association therewith in dashed lines;

FIG. 2 is a view in upright section of the device shown in FIG. 1 with a die member thereof in retracted position;

FIG. 3 is a view in upright section showing the device in extruding position with molding compound in the die member, a fragmentary portion of a sheet of absorbent paper and of a table being shown in association therewith;

FIG. 4 is a fragmentary view partly in front elevation and partly in upright section of the device with a dot of molding compound attached to a fragmentary portion of the sheet of paper, a fragmentary portion of the table being shown in association therewith;

FIG. 5 is a view in section taken on the line 5—5 in FIG. 2;

FIG. 6 is a view in section taken on the line 6—6 in FIG. 3;

FIG. 7 is an exploded view showing portions of a body and of a plunger of the device in association with a tubular die member thereof and a lump of molding compound, the die member being partly broken away and in section;

Figure 8:
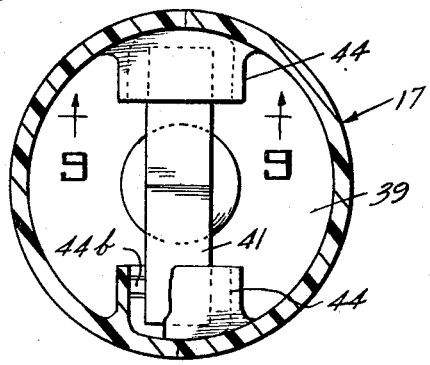
FIG. 8 is a view in section taken generally on the line 8—8 in FIG. 2.

In FIG. 1 is shown a dot depositing device 10 constructed in accordance with an embodiment of this invention. The device 10 is shown in association with a sheet of paper 12 on which an outline design 13 is provided. The device is used to place dots 14 of molding compound on the paper sheet. The sheet is formed of absorbent paper to that the molding compound adheres to the paper sheet. The molding compound can be of the type shown in U.S. Pat. No. 3,167,440 and can be of bright color so that the dots ornament the design.

As shown in FIGS. 2 and 3, the device 10 includes a body 16 including a hollow generally spherical head portion 17 and a tubular guide portion 18. An annular flage 19 is provided at a lower end of the guide portion to assist the operator in urging the body downwardly. Windows 21 in walls of the guide portion 18 permit cleaning any material that leaks past the top of the tube and dries. This way the dry material does not accumulate and hamper operation.

A tubular die member 23 slides inside the guide portion 18. The die member includes an interior annular flange 24 which forms an orifice 25 dividing the interior into a main chamber 26 and a mold chamber 27 at a lower end thereof. A lower edge or end 28 of the die member 23 forms a ring which can engage the sheet of paper 12 when the sheet is supported on a table 29. Molding compound 31 is extruded from the main chamber 26 through the orifice 25 into the mold chamber 27. The lower end of the mold chamber 27 has an open face so that the molding compound in the mold chamber can engage the sheet of paper 12. The sheet of paper is sufficiently absorbent that the molding compound adheres to the paper; and, when the body 16 of the device and the die member 23 are raised, as shown in FIG. 4, the molding compound parts at the orifice 25 leaving the dot 14 attached to the sheet of paper 12.

The die member 23 can be removed from the body 16 as shown in FIG. 7, and molding compound from a lump 33 of molding compound can be loaded into the main chamber 26 of the die member 23 through an open upper end 34 thereof.

A plunger 36 is mounted in the body 16 of the device as shown in FIGS. 2 and 3. The plunger 36 includes a cylindrical body 37 which is snugly telescopically received in the main chamber 26 of the die member 23. An enlarged head 38 of the plunger 36 overlies an annular flange 39 inside the head portion 17 of the body to retain the plunger 36 inside the body with the plunger being movable axially between the positions shown in FIGS. 2 and 3. A leaf spring 41 urges the plunger 36 to the FIG. 2 position in which the head 38 of the plunger engages the flange 39 when the plunger 36 is free. When the body 16 is pushed downwardly while the lower edge 28 of the die member 23 engages the sheet of paper 12 on the table 29, the plunger 36 is restrained by molding compound 31 in the main chamber 26. The spring 41 yields to move to the FIG. 3 position and changes position with an audible click when the pressure with which the body is pushed downwardly is more than barely sufficient to cause extrusion of the molding compound through the orifice 25. When the spring has changed its position to that shown in FIG. 3, the spring is engaged by a lug 42 in the head portion 17 of the body of the device so that, as the body 16 is pushed further downwardly, the lug 42 acts as a dead stop for the spring 41 and the plunger 36, and further downward urging of the body 16 causes further extrusion of molding compound through the orifice 25 into the mold chamber 27 to engage the paper sheet 12.

Figure 9:
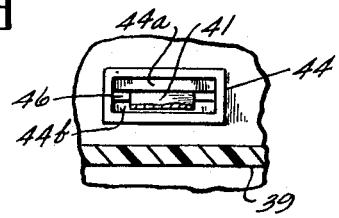
FIG. 9 is a view in section taken on the line 9—9 in FIG. 8.

The spring 41 is supported by brackets 44 inside the head portion 17 of the body. The brackets permit the spring to flex without coming free of the brackets. End portions of the spring 41 extend into slots 46, one of which is shown in FIG. 9 between upper and lower portions 44a and 44b of the end bracket 44. When the plunger and head have been pushed downwardly to the limit of their relative movement, an upper edge 46' of the die member 23 engages the flange 39, as shown in FIG. 2.

Figure 10:
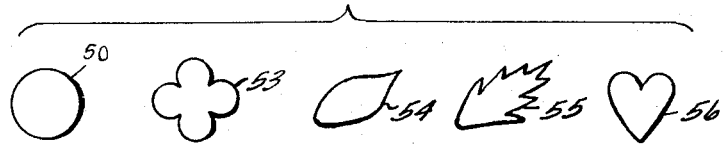
FIG. 10 is a bottom plan view of a group of dots formed by die members being mold chambers of differing shapes at discharge ends thereof.
Figure 11:
FIG. 11 is a view in side elevation of a group of dots formed by die members being mold chambers of differing inner shapes.

When the device is used, molding compound from the lump 33 (FIG. 7) is loaded into the main chamber 26 of the die member 23, and the die member is mounted on the plunger 36 as shown in FIG. 3. When the body 16 is pushed downwardly while the lower end 28 of the die member 23 engages the sheet of paper 12 on the table 29, the molding compound in the main chamber 26 resists downward advance of the plunger 36, and the spring 41 can exert a force on the plunger which can be just sufficient to cause extrusion of the molding compound through the orifice 25. When the force exceeds that amount, the spring 41 yields and moves to the FIG. 3 position with an audible click which informs the user that he is exerting approximately the required force and warns him against exerting substantially greater force as the molding compound is extruded through the orifice 25 into the mold chamber 27. A dot 14 is formed when the mold chamber has been filled with molding compound. A lower face 50 of the dot is of much greater area than the cross section of a neck portion 51 of the dot formed inside the orifice 25 so that, when the device is withdrawn from the paper sheet 12, the dot adheres to the paper sheet, and the molding compound breaks free at the neck 51. In a preferred form of my device for use with conventional molding compounds, the diameter of the orifice can be ⅛ inch and the diameter of the dot's lower face 50 can be ⅜ inch so that the area of the face 50 is approximately 9 times the cross section area of the neck portion 51 and the orifice 25. The device is shown with a die which makes a dot having a circular face 50, but the shape of the face 50 can be of some other shape if desired. For example, the open face of the mold chamber can be a square or an equilateral triangle or other selected shape. The actual design of the mold chamber defines the shape of the deposit or dot on the sheet of paper. As shown in FIG. 10, other designs include a flower 53, leaves 54 and 55, and a heart 56. As shown in FIG. 11, the height patterns can vary from flat as shown at 57 to conical at 58 to hemispherical at 59 to concave at 60. The die member is formed of nonporous rigid plastic material to which the molding compound does not adhere. Dots can be arranged in any desired arrangement to provide decorative designs which can be formed readily and quickly.

The molding device illustrated in the drawings and described above is subject to structural modification without depending from the spirit and scope of the appended claims.

Having described my invention, what I claim as new and desire to secure by Letters Patent is:

1. A device for depositing dots of molding compound on an absorbent sheet which comprises a body including a hollow head an an elongated tubular guide portion, a tubular die member mounted for sliding inside the guide portion, a plunger having a cylindrical body telescopically received in a main chamber of the die member and a head inside the hollow head of the body, there being an open-faced mold chamber at a free end of the die member, and spring means mounted in the head of the body and engaging the head of the plunger, the spring means being adapted to exert substantially a sufficient force on the plunger when the free end of the die member engages the sheet and the body is urged toward the sheet to cause extrusion of molding compound from the main chamber into the mold chamber, the spring yielding with an audible click when the body is urged with greater force.

2. A device in accordance with claim 1 wherein an orifice is formed in the die member between the main chamber and the mold chamber.

3. A device in accordance with claim 2 wherein the area of the open face of the mold chamber is approximately nine times the cross sectional area of the orifice.

4. A device in accordance with claim 1 wherein a dead stop is located inside the head of the body and is engageable by the spring when the spring is in yielded position to exert force on the spring and on the plunger when the head is urged toward the sheet following the yielding of the spring.

5. A device as in claim 1 wherein the head of the plunger is enlarged and a flange inside the head of the body is engaged by the head of the plunger when the plunger is freely urged by the spring.

6. A device as in claim 5 wherein the die member is engageable with the flange when in a retracted position.

7. A device as in claim 1 wherein the ratio of the area of the open face of the mold chamber to the cross-sectional area of the orifice is so great that material adherence to the sheet it is applied to is greater than the strength of the material in tension at the orifice.

References Cited

UNITED STATES PATENTS

| | | | |
|---|---|---|---|
| 1,978,942 | 10/1933 | Harris | 107—48 F |
| 2,055,868 | 8/1935 | Larsen | 107—52 |

H. A. KILBY, JR., Primary Examiner

U.S. Cl. X.R.

425—151, 173, 192, 376